US006931604B2

(12) United States Patent  
Lane

(10) Patent No.: US 6,931,604 B2
(45) Date of Patent: Aug. 16, 2005

(54) METHOD OF NAVIGATING A COLLECTION OF INTERCONNECTED NODES

(76) Inventor: Derek Graham Lane, 2655 Harrison St., San Francisco, CA (US) 94110

( * ) Notice: Subject to any disclaimer, the term of this patent is extended or adjusted under 35 U.S.C. 154(b) by 515 days.

(21) Appl. No.: 10/055,455

(22) Filed: Jan. 23, 2002

(65) Prior Publication Data

US 2002/0105552 A1 Aug. 8, 2002

Related U.S. Application Data

(60) Provisional application No. 60/256,234, filed on Dec. 18, 2000.

(51) Int. Cl.$^7$ ................................................. G06F 3/14
(52) U.S. Cl. ..................... 715/853; 715/815; 715/811; 715/866
(58) Field of Search ................................ 345/745, 746, 345/440; 715/853, 855, 765, 866, 856, 859, 860, 745, 746, 835, 838, 811, 815, 821, 825

(56) References Cited

U.S. PATENT DOCUMENTS

| | | | | |
|---|---|---|---|---|
| 5,390,295 A | * | 2/1995 | Bates et al. | 345/789 |
| 5,506,937 A | | 4/1996 | Ford et al. | |
| 5,835,085 A | * | 11/1998 | Eick et al. | 715/853 |
| 5,877,766 A | * | 3/1999 | Bates et al. | 345/854 |
| 6,037,944 A | | 3/2000 | Hugh | |
| 6,300,957 B1 | | 10/2001 | Rao et al. | |
| 6,437,799 B1 | * | 8/2002 | Shinomi | 715/853 X |
| 6,486,898 B1 | * | 11/2002 | Martino et al. | 715/853 |
| 6,509,898 B2 | * | 1/2003 | Chi et al. | 345/440 |
| 6,760,048 B1 | * | 7/2004 | Bates et al. | 345/797 |

OTHER PUBLICATIONS

Rao, R.; Sprague R.H., Natural Technologies for Knowledge Work: Information Visualization. J. Know. Mgmt. 2(2). Dec. 1998.

Robertson,G.G. et. al. Data Mountain: Using Spatial Memory for Document Management. Download from Microsoft Research Web Site.

Tenenbaum J.B. et.al. A Global Geometric Framework for Non–Linear Dimensionality Reduction. Science vol. 290, pp. 2319–2323 Dec. 2000.

Roweis S.T. et.al. Nonlinear Dimensionality Reduction by Locally Linear Embedding. Science vol. 290 pp. 2323–2326 Dec. 22, 2000.

Kohenen T. Self–Organizing Maps. 3rd Ed Springer–Verlag pp. 106–115. Copyright. 1995, 1997, 2001.

Robertson G.G. et.al. Information Visulization using 3D Interactive Animation, Comm. ACM 36(4) pp. 57–71 Apr. 1993.

The Brain Technologies, "Personal Brain", Copyright Date 2001. www.thebrain.com.

Plumb Design, "Think Map Visual Thesaurus," Copyright Date 1998. www.thinkmap.com.

Inxight Software, "Star Tree," Copyright Date 1996–1997. www.inxight.com.

* cited by examiner

*Primary Examiner*—Raymond J. Bayerl

(57) ABSTRACT

A method and apparatus for organizing and processing interconnected pieces of information ("nodes") using a digital computer is disclosed. Each node has elements that may be text, images, audio, video, and other computer programs. A graph-based user interface presents the individual nodes in spatial arrangements that reflect the relationships among the nodes. User interaction indicating interest in a particular node results in an increase in the "activation" of that node. This leads to an increase in the size of the presentation of that node, as well as an increase in the size of the presentation of closely related nodes. The result is a unique user interaction paradigm that allows for intuitive traversal of complex collections of nodes.

3 Claims, 10 Drawing Sheets

METHOD OF NAVIGATING A COLLECTION OF INTERCONNECTED NODES

CROSS-REFERENCE TO RELATED APPLICATIONS

This application is entitled to the benefit of Provisional Patent Application Ser. No. 60/256,234 filed Dec. 18, 2000.

STATEMENT REGARDING FEDERALLY SPONSORED RESEARCH

Not applicable.

REFERENCE TO SEQUENCE LISTING

Not Applicable.

BACKGROUND

Field of Invention

This invention relates to graph-based user interfaces, which are user interfaces that display a collection of data objects arranged spatially to reflect the relationship among the objects. This form of user interface is also referred to as a concept map.

BACKGROUND

Description of Prior Art

A graph is mathematically defined as a set of nodes with a set of edges that connect the nodes. A graph can be visually represented using a diagram, which depicts the edges as lines or other connecting devices between the nodes.

Graphs and diagrams have been used throughout history to represent the relationship among concepts or objects. They have been used to depict the relationships among people (family trees, organization charts) and scientific or mathematical knowledge (chemical reaction diagrams, Feynman diagrams in particle physics). As technology advanced, the use of graphs and diagrams become more common as a means of capturing the interaction among parts of complex systems (schematic diagrams for circuits, flowcharts for computer software).

In the 1980s, the spread of personal computers made it easier for individuals to quickly produce their own graphs and diagrams. By the mid 1990s, a type of graph called a concept map achieved a modest amount of popularity as a means of capturing and understanding the relationship among concepts, ideas, or things.

In U.S. Pat. No. 5,506,937 to Ford (1996), concept maps play a significant role. In this system, a user interface is described for browsing knowledge contained within an expert system. The browsing interface consists of a concept map with nodes that depict various objects corresponding to concepts in the domain being explored. The concept map places nodes that represent related concepts close together, with explicitly drawn links between concepts.

The user can interact with the nodes to open a window with more details about the node's concept. The details may be an image, an audio or video recording, or a more detailed textual display of the node. The details may also be another concept map, in which case the new concept map appears in a new window where the user can interact with it.

There are several drawbacks to the Ford method. The concept maps used in the Ford system are static diagrams that must be authored by a knowledge engineer. This authoring includes the layout of the nodes on the concept map. Because the nodes are in a fixed position on the concept map, the system cannot dynamically rearrange the map in response to user actions. Furthermore, the nodes depicted on the concept map only display a title or a few key words describing each node. To see more details about a node, the user must open an additional window on top of the concept map. This additional window partially obscures the concept map.

Another drawback is caused by the display of nodes and relationships statically on a two-dimensional surface. This makes depicting highly non-hierarchical graphs (graphs with significant cross-links among its nodes) difficult, because a highly non-hierarchical network of nodes will not map onto a two-dimensional surface without significant inaccuracies in the mapping. In order to perform such a mapping, the system needs to prioritize the information being displayed, both by prioritizing particular nodes in the network, and also by prioritizing the links connecting the nodes. Concept maps do not prioritize either the nodes or the links. Without such priorities, graph layout decisions are difficult to make.

Several improvements to the static concept map approach have been proposed over the past several years. The simplest of these are based on the interactive layout of the nodes surrounding a currently selected node. These selected-node layouts provide a solution to the problem of prioritizing the nodes: the currently selected node has the highest priority. Other nodes have decreasing priority based on how many links removed they are from the selected node. This aids in traversing non-hierarchical graphs by creating a local hierarchy centered on the currently selected node.

U.S. Pat. No. 6,256,032 to Hugh (2001) describes a selected-node user interface. This user interface has a relatively pre-defined layout for the nodes that is designed for navigating a primarily hierarchical graph. The currently selected node is placed at the center of the graph. Children of the currently selected node are arranged in a grid below it. The parent of the currently selected node is displayed above and to the right of it, and the siblings are displayed in a list to the right of the parent.

A second list to the left of the parent is used to display nodes that are cross-linked (non-hierarchically linked) to the currently selected one. This provides some degree of non-hierarchical navigation, but it does so by imposing a local hierarchy around the selected node.

The Hugh method was designed to work with two windows. One of the windows displays the actual graph with the currently selected node at the center. The second window displays a more detailed version of the currently selected node. Like the Ford method, the Hugh method depicts the nodes on the graph with only a short title or keywords. As the user selects a new node, the display shifts to place that node at the center, and its parent, siblings, and children assume their appropriate positions. Simultaneously, the second window displays detailed information about the selected node.

The selected node paradigm is more flexible than the static map approach of the Ford method. By allowing the user to select a current node, the system can interactively adjust the graph in response to the users input. However, this response is fairly simplistic, allowing only selection of one node at a time. For instance, suppose that the user has selected a node recently, but it is not currently the selected node. The fact that it had been selected recently will play no role in determining the position or size of the node. Only the number of links from the currently selected node is important in determining the position and size.

U.S. Pat. No. 6,300,957 to Rao et. al. (2001) is another selected-node layout method that uses a hyperbolic mapping to arrange other nodes around the currently selected one. This is effective because the hyperbolic mapping provides more space for nodes that are closer to the currently selected one. This method has been implemented by Inxight, Inc., of Santa Clara, Calif., in their Cyberbolic display. FIG. 1 shows the user interface to the Cyberbolic display.

As the user selects a node in the Rao method, that node assumes the center position in the graph. Other nodes are arranged around the selected node, based on the number of connections to the selected node. Nodes that are one link away from the selected node are displayed on a ring immediately surrounding the selected node; nodes that are two links away are displayed on a ring outside the first one, etc. As the nodes get further away from the selected node, the rings get closer together and the nodes (as displayed on the graph) get smaller due to the hyperbolic mapping.

The advantage of this system is that more screen area is given to nodes close to the selected node, which presumably hold more interest to the user than nodes further from the selected node. However, the selected-node mechanism utilized by the Rao method is just as limited as that used by the Hugh method. And like the Ford and Hugh methods, the only information presented for each node is a short title or a few keywords.

All three of these systems lack the ability to utilize prioritization information to assist in the user interaction. Such prioritization information can come from the user interactions, or it can come from values stored with the graph. This additional prioritization information can then be utilized by the graph layout procedure to determine an optimal layout, given the priorities for the nodes and the priorities for the links connecting the nodes.

A mathematical mechanism of utilizing such priorities during node layout has been known for many years. In the early 1980s, the mathematician Teuvo Kohonen devised a theory to explain the development of connections in a neural network, called the self-organizing map. This mechanism accounts for the physical proximity of neurons with similar response properties in biological neural networks. Mathematically, the theory proposes an energy function for the entire neural network consisting of contributions from pairs of neurons. The energy function is formulated so that if two similar neurons are close together, the energy will be lower than if they are further apart.

Development in this model proceeds by modifying the positions of nodes within the neural network so as to minimize the energy function, resulting in a mapping that places similar neurons near each other. Using Kohonen's construction, it is possibly to construct a graph layout algorithm that determines optimal placements of nodes given a set of priorities on the links connecting the nodes.

Kohonen's work is primarily concerned with the automated generation of static maps. No provisions are made for user interactions that might dynamically change the maps. Additionally, Kohonen's original formulation incorporated prioritization information for the connections between the nodes in the neural network, but it did not incorporate priorities on the nodes themselves. However, additional layout constraints can be included through suitable modification of the energy function.

ThinkMap, by Plumb Design of New York, N.Y., is a graph-based user interface that appears to use a variant of Kohonen's self-organizing map to layout its nodes. FIG. 2a shows the user interface to this system. It is a selected-node layout like the Rao method and the Hugh method, but it exhibits more flexibility in its layouts. For instance, some nodes can be displayed with more space surrounding them than others. It is not clear whether this additional space is used to emphasize nodes that have been assigned a higher priority. If this is the use, then the node prioritization scheme is limited in that no changes in the priority of the nodes appear to occur during user interaction. Like the other two selected-node interfaces, it provides limited information about the nodes on the graph itself, instead using a second window to display more details about the currently selected node.

ThinkMap is better able to traverse non-hierarchical graphs than either the Hugh method or the Rao method. However, lacking true node and link prioritization, the map can quickly becomes tangled if the links are highly non-hierarchical. This is illustrated in FIG. 2b.

In conclusion, the drawbacks of the prior art are:
1) The simplistic mechanism for node selection provides limited user input to the graph layout mechanisms
2) The presentation of nodes on the graph provides limited information about each node, requiring a second window to be opened to display more details about a node
3) The absence of prioritization information for both nodes and links makes the layout mechanisms simplistic and unable to handle complex non-hierarchical relationships among the nodes.

BRIEF SUMMARY OF THE INVENTION

The present invention solves the stated drawbacks of the prior art in several respects. It provides a selection mechanism that establishes priorities for the nodes as the user navigates through the graph. These priorities change as the user interacts with the graph, reflecting shifts in the user's interest. It also utilizes link priorities to assist in the graph layout. These features of the system are used to create a more meaningful dynamic depiction of the graph.

The specific innovations of the present invention over the prior art are as follows.
1) The user selection mechanism provides a more refined level of user input that reflects degrees of interest in different nodes.

Rather than a simple selected-node mechanism, the user's actions are translated into an activation value for each node. This activation value is a numerical quantity that represents the amount of interest the user currently has in the node. In the current embodiment, the activation value is a floating point value between 0.0 and 1.0. Because each node has its own activation value, the user's interest can involve more than one node at once.

In the preferred embodiment, the user does not directly specify the activation for each node. Instead, the user's actions are interpreted to either increase or decrease the activation of each node. In the absence of actions indicating interest in a node, the activation values for that node will gradually decay over time. In this way, the set of activation values for all of the nodes carries information not only about the user's interest at the current moment, but also the user's interest in the recent past.

2) The node activation values determine how much space is allocated to each node on the display. Nodes with higher activation values, in which the user is presumably more interested, are proportionately larger than nodes with lower activation values.

The additional space for higher activation nodes is used to display more details about the node, including text, images, video, audio, and any other information that may be stored with the node. The user can see more details about nodes of interest directly on the graph without having to open additional windows that would obscure the graph display.

3) The node activation values are also used during graph layout as a means of prioritizing nodes. Additionally, the links themselves are prioritized using weight values for each link.

The link weights are numerical values for each link that indicate how strongly the two linked nodes are related. In the current embodiment, the links are weighted from 0.0 to 1.0. The link weights and activation values together determine which relationships among the nodes should be depicted more accurately. By using this prioritization information, the present invention is able to display and navigate non-hierarchical graphs more effectively than the prior art.

The link weights serve a further purpose in navigation. As the user activates a node, the increase in activation is propagated to nodes that are linked to that node. The strength of propagation is determined by the weight of the link. In this way, the user's interest in one node induces activation of other nodes that are strongly linked to it, and the user can more efficiently traverse the network.

The present invention is a graph-based user interface that improves the prior art in several respects. These include a novel node selection mechanism, a flexible means of depicting nodes to show more detail for nodes that are more salient, and a sophisticated graph layout algorithm that makes use of information both about the users present interests and the weighted relationships among the nodes.

DETAILED DESCRIPTION

Figure 1:
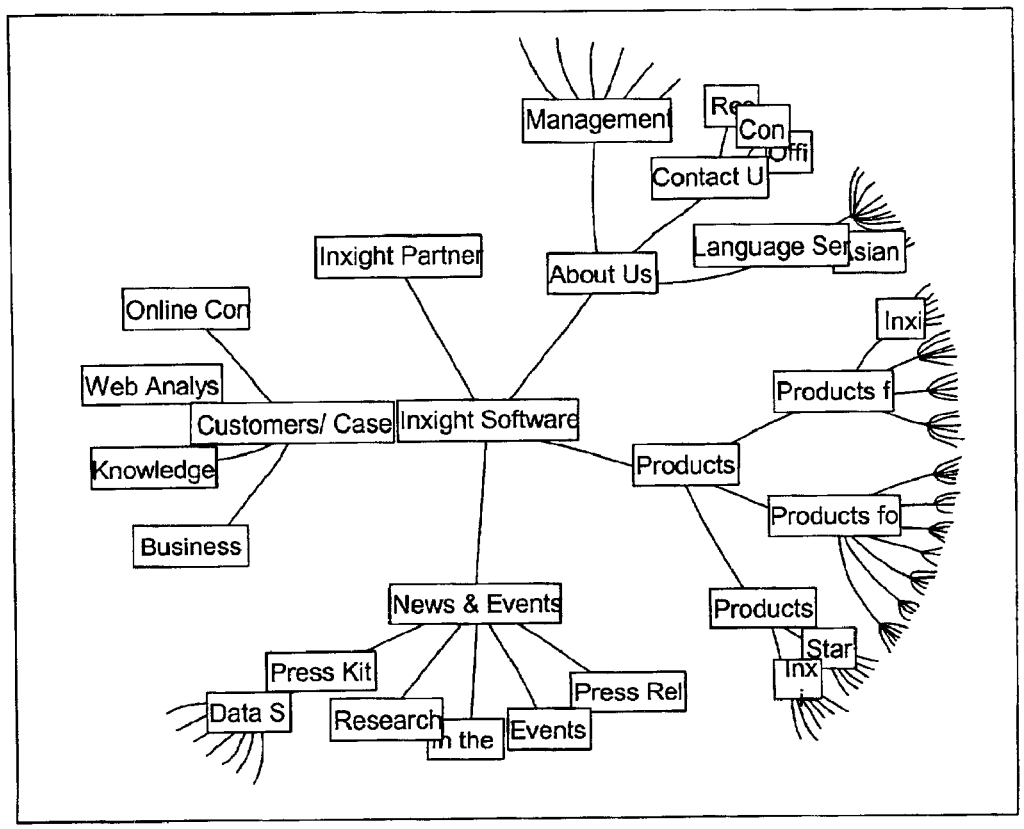
FIG. 1 is an example of the Cyberbolic user interface, which embodies the Rao method.
Figure 2A:
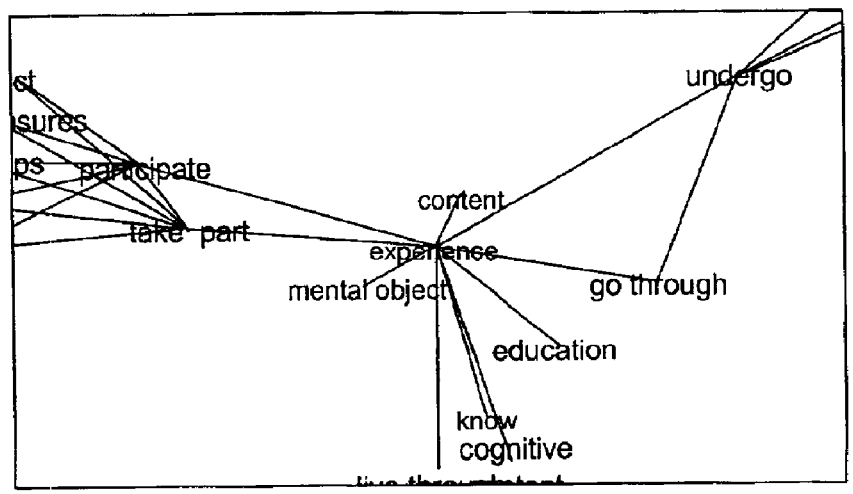
FIG. 2 is an example of the ThinkMap user interface.
Figure 2B:
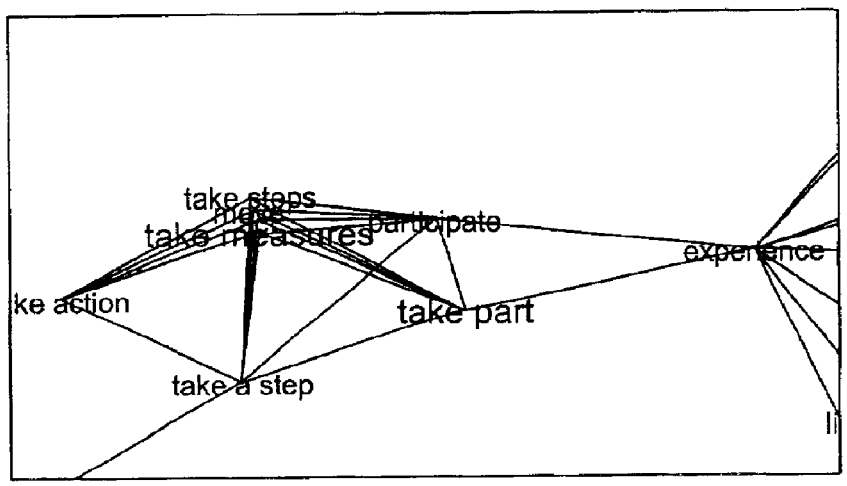
Figure 3:
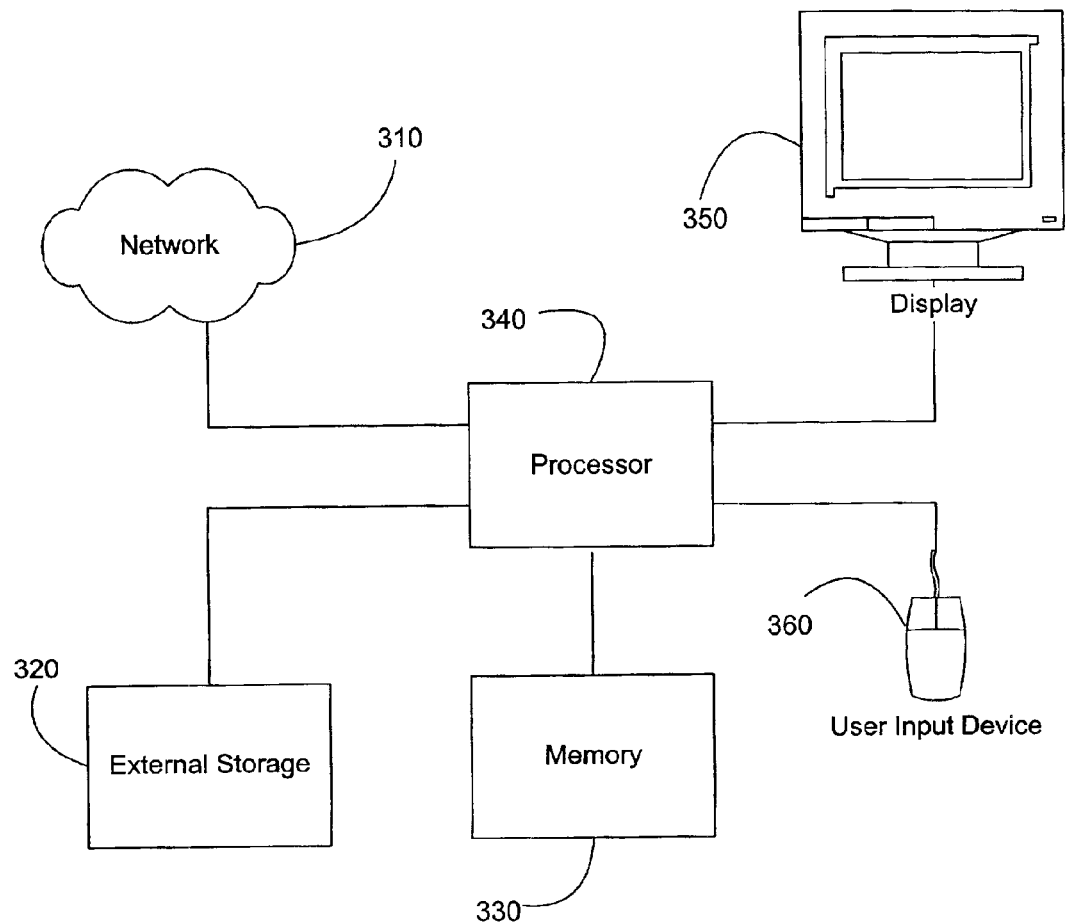
FIG. 3 is a system diagram depicting the physical components of the present invention and the connections among those components.

FIG. 3 is a block diagram of a system that embodies the present invention. The processor 340 is responsible for the main computations associated with interacting and traversing the graph. The memory 330 contains an internal representation of the graph and also is used for various computations and generating the map diagram. The display 350 is responsible for displaying the generated map diagram to the user. The user input device 360 may be a mouse, trackball, keyboard, or any other suitable means for the user to interact with the system. The external storage device 320 may be a hard disk drive, CD-ROM, optical drive, or any other suitable storage device. The network 310 can be the Internet, a local network, or another means of accessing and retrieving information from another computer system. Additional devices may be added to the system, such as an audio system or a different means of displaying the generated map diagrams.

The current embodiment of the present invention has been implemented on a Microsoft Windows™-compatible PC, using C++ as the programming language and the Microsoft Foundation Classes (MFC) as the application framework. MFC provides many of the base functions associated with the operation of the memory, external storage device, network, display, and user input device.

The application was designed using object-oriented analysis and design (OOA/D) techniques, so the design will be presented using the preferred notation for these techniques, the Unified Modeling Language (UML).

Note that any suitable operating system, programming language, and design methodology could be used to design and build this invention.

Figure 4:
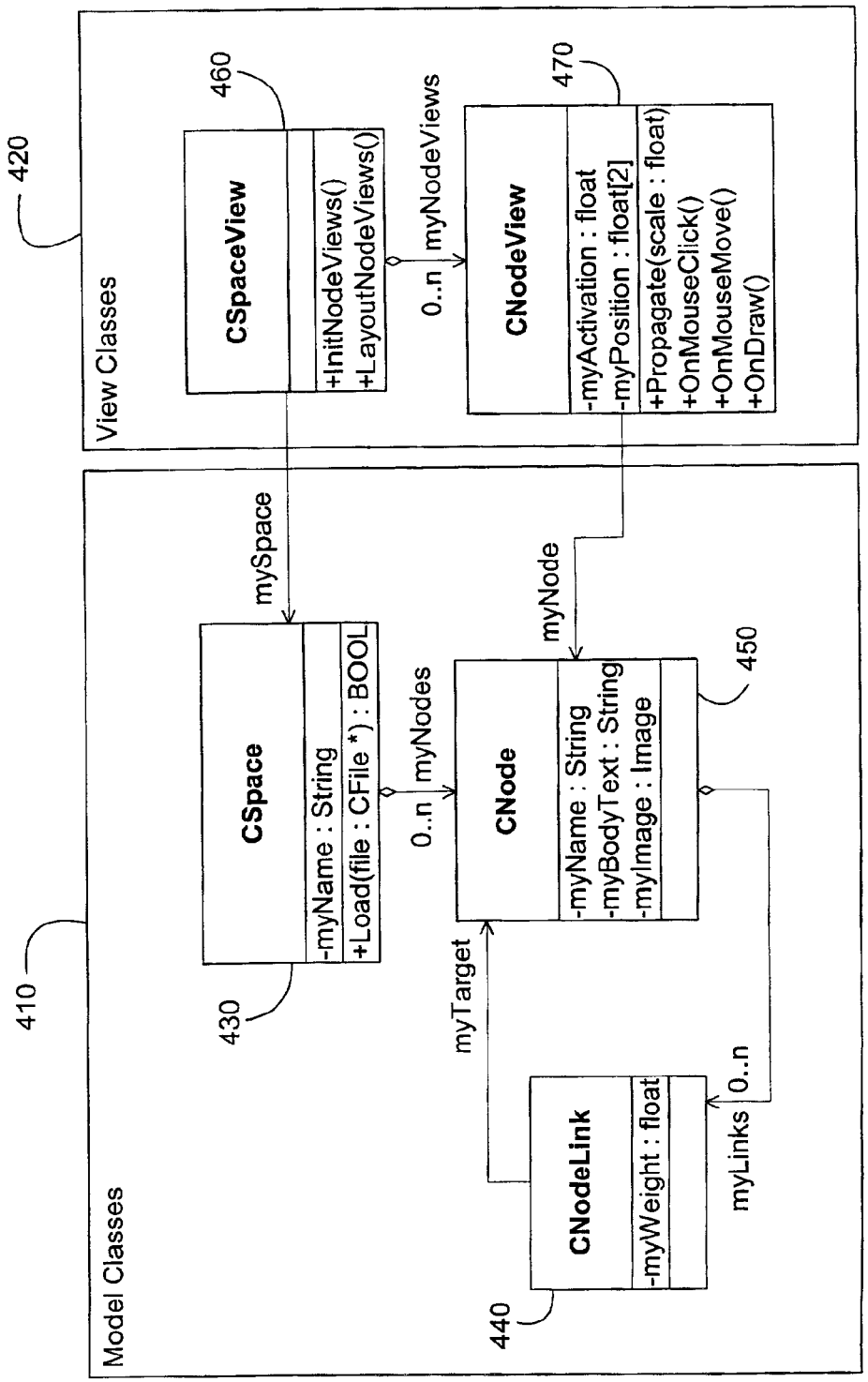
FIG. 4 is a class diagram depicting the major classes of the preferred embodiment of the present invention, the attributes and operations of the classes, and the associations among members of the classes.

FIG. 4 is a UML class diagram for the main classes of the preferred embodiment. A class diagram is the main design artifact of an object-oriented system. It shows the major classes of objects within the system, the characteristics of those objects, and the relationships among those objects.

Each class has attributes, which are values stored for the objects of the class. Each class also has operations that are performed on objects of the class. Each class also has relationships that are represented in the class diagram as lines connecting to other classes. Note that each class is named starting with a "C", as in "CNode". This is consistent with the naming style used in MFC.

Two groups of classes are defined: the Model classes and the View classes. The model classes 410 are the classes that represent the graph itself internally within the system memory. Three classes are used to represent the parts of the graph: the nodes (CNode 450), the links (CNodeLink 440), and the container that holds the nodes (CSpace 430). These three classes together completely represent the graph.

The class CNode represents the nodes, and CNode objects contain the node's title, body text, any images, and any additional information that may be associated with the node such as an audio clip. Each CNode also contains a collection of zero or more CNodeLinks, each of which represents a link to another CNode. The CNodeLinks contain the link weight as an attribute.

All of the CNodes that are interlinked are collected together into a single CSpace. The CSpace manages various operations for all of the CNodes in the CSpace.

All of the nodes in a CSpace must be able to be saved and restored from a persistent storage device. This device may be an external storage device 320 connected to the computer, or it may exist across a network 310. The form of storage may be in a flat file or it may be in a database.

The means by which the graph can be retrieved from a persistent store is generally understood in the art. The preferred embodiment utilizes the serialization mechanism built in to MFC in order to retrieve the model classes from a persistent store. This mechanism can be used for either external storage devices or serialization over a network. This function is implemented within the CSpace::Load function.

The view classes 420 are classes that represent the model objects on the display device 350. The view classes generally also handle user input from the user input device 360. The two view classes are CSpaceView 460 and CNodeView 470. These represent the views of the entire space of nodes and the individual node, respectively. A CSpaceView contains a plurality of CNodeViews, one for each CNode in the CSpace. The CSpaceView is responsible for arranging the CNodeViews within it according to the layout procedure described below. The CNodeViews are responsible for rendering the contents of the associated CNode, using the drawing procedure described below.

The CNodeView contains attributes that represent its position within the CSpaceView. This position is determined by the layout procedure described below. Each CNodeView also stores the current activation value for the node. The activation value is a value from 0.0 to 1.0, and it represents the fraction of the area of the containing CSpaceView that the CNodeView occupies. So a CNodeView with an activation of 0.1 would have an area equal to one-tenth of the total area of the CSpaceView.

Figure 5:
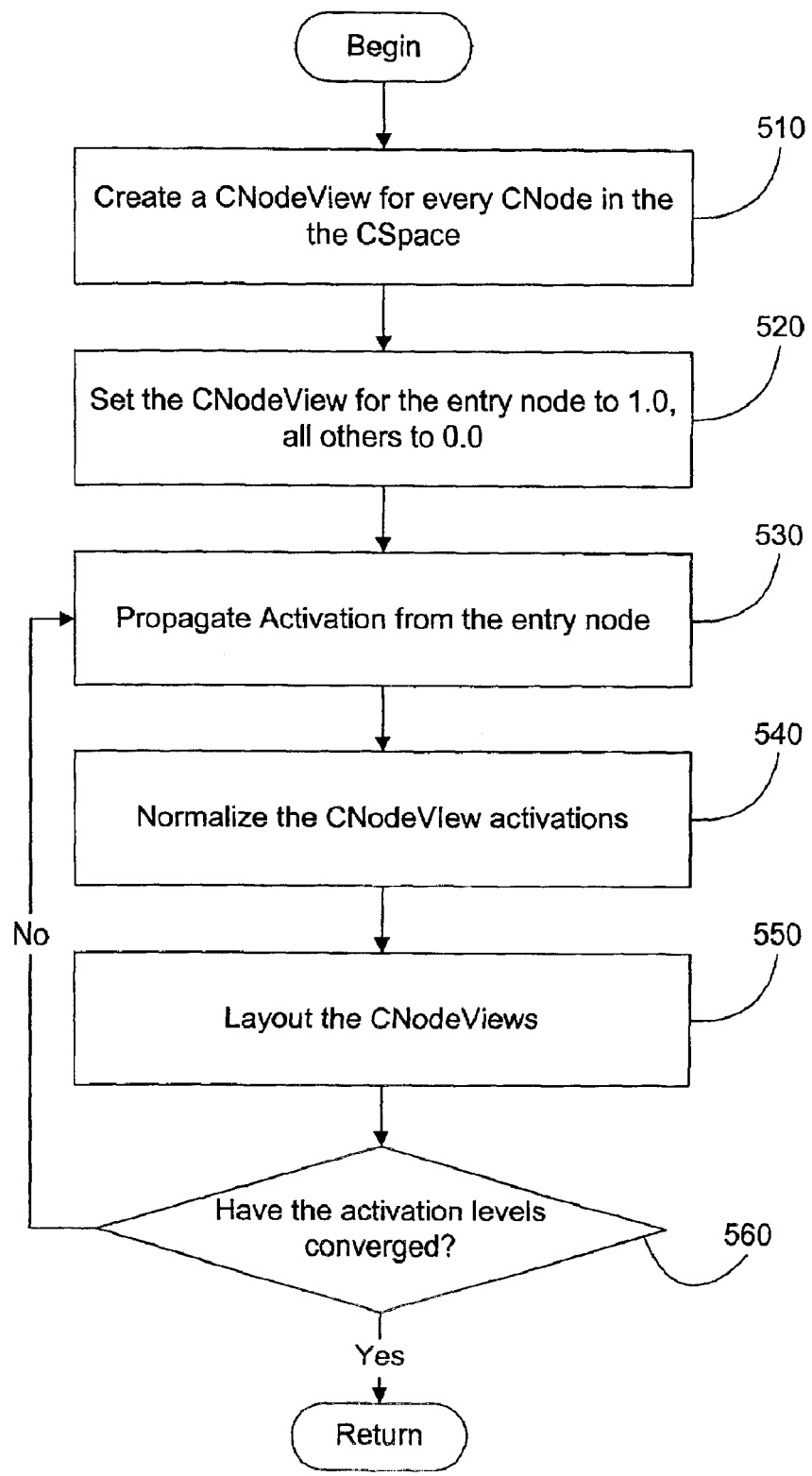
FIG. 5 is a flowchart depicting the operations comprising the CSpaceView::InitNodeViews procedure, which is responsible for creating and initializing the CNodeViews for a collection of CNodes.

FIG. 5 is a flowchart showing the CSpaceView::InitNodeViews procedure, which is responsible for creating and initializing the CNodeViews after a new CSpace has been loaded from persistent storage. For each CNode, a new CNodeView is created and added to the CSpaceview 510. Then the root CNode (which is the main entry point into the graph) is located, and the associated CNodeView for the root CNode is located. This CNodeView's activation is then set to 1.0, while the activation for all other CNodeViews are set to 0.0 520.

The activation value is propagated from the root CNodeView to the others 530, using the propagation procedure described below. After propagation, the CNodeView activations are normalized 540 so that they sum to a constant value (0.45 in the preferred embodiment, indicating that the total area of the CNodeViews is 0.45 of the total area of the CSpaceView that contains them). Then the CNodeViews are laid out 550 using the layout procedure described below.

Finally, if the change in activation for the CNodeViews is larger than a pre-defined threshold, the process is repeated 560. This continues until the activation values converge. Once the activation values converge, the system presents the CNodeViews at the positions determined by the layout procedure, and then waits for user input.

After the initial positions and activation levels for the CNodeViews have been determined, the CNodeViews must draw themselves at the proper position on the CSpaceView window. In the current embodiment, a progressive strategy is pursued where incrementally more information about the node is displayed. If the area is very small, only the title or part of the title is displayed. As the area increases, an image (if present) is depicted to the left of the title, growing in size as the area increases further.

When the area is large enough to contain more than one line of text, the node's body text is displayed beneath the title (and to the right of the image, if available). The body text is displayed in a smaller font than the title text, and it receives most of the additional area as more area is given to the node.

More sophisticated layout algorithms are possible. In particular, using a general markup language such as HTML makes it possible to perform custom layouts based on the size of the display. In this case, statements within the markup code are used to determine which parts of the node should be displayed, what font should be used, and where they should be displayed. This would also provide more flexibility in terms of multiple images per node, background images, etc.

Two modes of user input are available. Both operate by interpreting a user action as indicating interest in a particular node. This results in the activation of the CNodeView for that node is increased.

Figure 6:
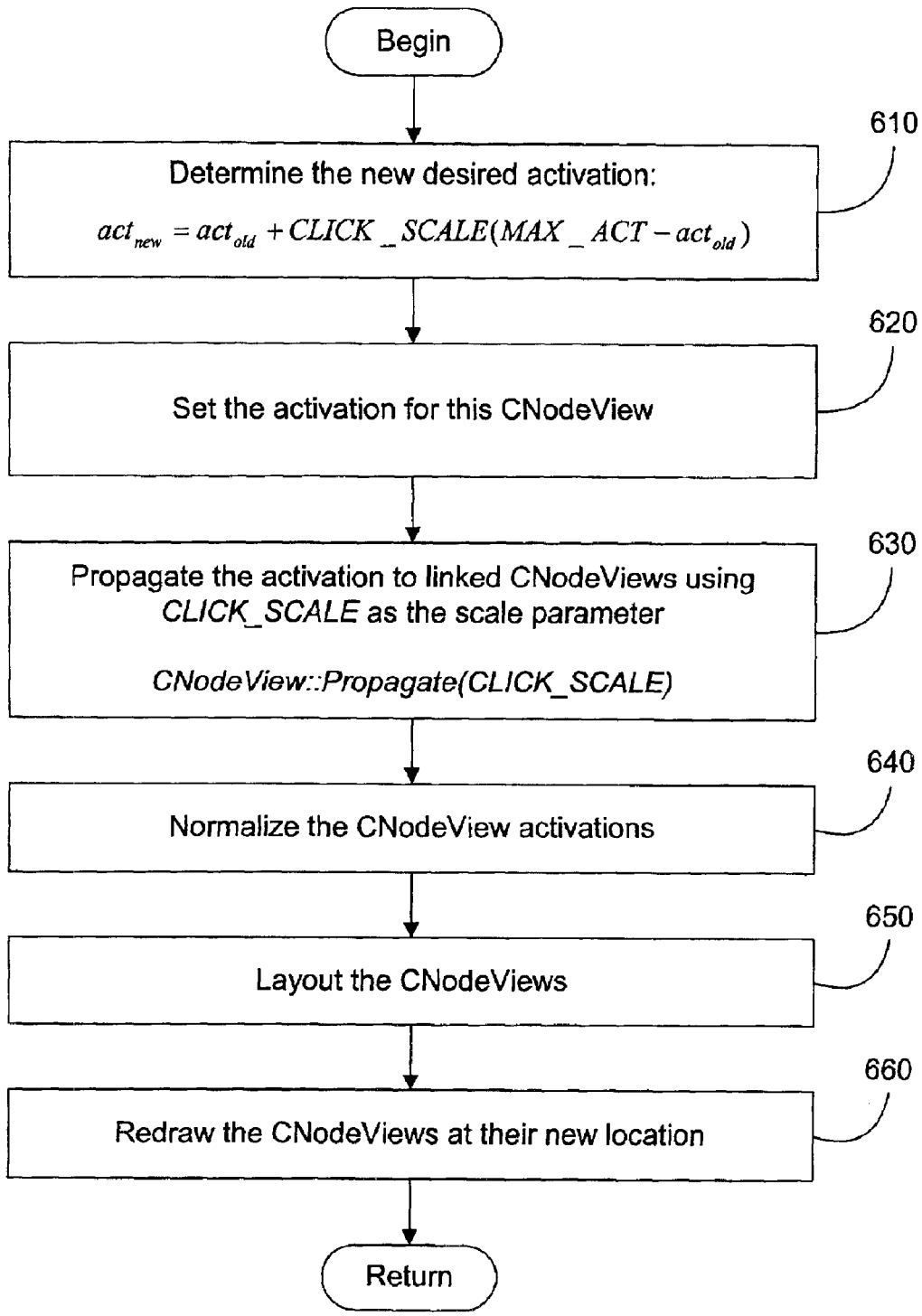
FIG. 6 is a flowchart depicting the operations comprising the CNodeView::OnMouseClick procedure, which is responsible for responding to a mouse click on a particular CNodeView.

FIG. 6 is a flowchart showing the CNodeView::OnMouseClick procedure, which is the first mode of user input. This procedure is called by the system in response to the user positioning the mouse pointer over a CNodeView and clicking the mouse button. Alternatively, a different input device could be used (such as a track ball) that also has a means of positioning a pointer over a CNodeView and a means of indicating interest.

When the button click occurs, the system interprets the click by locating the CNodeView that is to receive mouse clicks (the one underneath the current position of the pointer), and then calling the CNodeView::OnMouseClick procedure.

The CNodeView::OnMouseClick procedure first computes the new desired activation for the CNodeView 610 using the following formula:

$$\text{act}_{new} = \text{act}_{old} + \text{CLICK\_SCALE}(\text{MAX\_ACT} - \text{act}_{old}) \quad (1)$$

where $\text{act}_{old}$ is the old activation value and $\text{act}_{new}$ is the new activation value.

MAX_ACT is a constant that indicates the maximum activation value any single CNodeView can have. In the preferred embodiment MAX_ACT is defined as 0.33.

CLICK_SCALE is a constant that indicates how much the old activation value should be increased toward MAX_ACT for each click. For the preferred embodiment, CLICK_SCALE is defined as 0.33.

The CNodeView's activation is then set to the new activation value 620. As can be seen from the formula, the result of clicking multiple times on a CNodeView is that the activation increases, approaching the MAX_ACT value.

After the increase in activation, the OnMouseClick function then propagates the activation increase to linked nodes 630 using the propagate procedure described below. Finally, all of the CNodeView activations are normalized 640, layout is done 650, and the CNodeViews are drawn at their new position 660.

Figure 7:
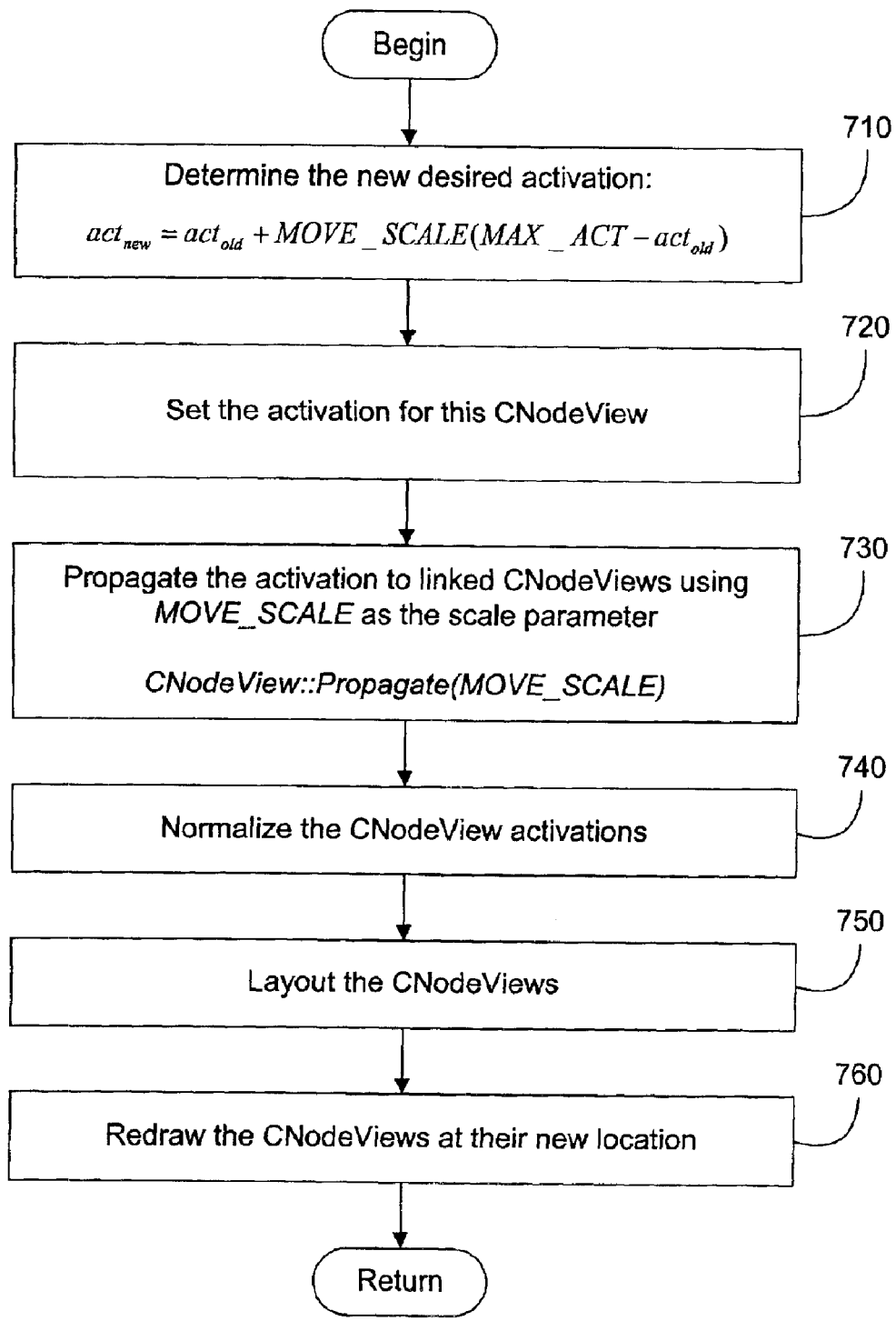
FIG. 7 is a flowchart depicting the operations comprising the CNodeView::OnMouseMove procedure, which is responsible for responding to a mouse move event over a particular CNodeView.

FIG. 7 is a flowchart showing the CNodeView::OnMouseMove procedure, which is the other mode of user input. This procedure is called by the system in response to the user moving the mouse pointer over a CNodeView. Alternatively, a different input device could be used (such as a track ball) that also has a means of moving a pointer visible on the display screen.

When the move event occurs, the system interprets the click by locating the CNodeView that is to receive the move event (the one underneath the current position of the pointer), and then calling the CNodeView::OnMouseMove procedure.

The CNodeView::OnMouseMove procedure first computes the new desired activation for the CNodeView 710 using the following formula:

$$\text{act}_{new} = \text{act}_{old} + \text{MOVE\_SCALE}(\text{MAX\_ACT} - \text{act}_{old}) \quad (2)$$

where $act_{old}$ is the old activation value and $act_{new}$ is the new activation value.

MAX_ACT is a constant that indicates the maximum activation value any single CNodeView can have. It is identical to the MAX_ACT constant in the CNodeView::OnMouseClick procedure. In the preferred embodiment MAX_ACT is defined as 0.33.

MOVE_SCALE is a constant that indicates how much the old activation value should be increased toward MAX_ACT for each move event. Because move events occur more frequently than click events, the MOVE_SCALE constant will generally be significantly smaller than the CLICK_SCALE constant. For the preferred embodiment, MOVE_SCALE is defined as 0.10.

The CNodeView's activation is then set to the new activation value 720. As can be seen from the formula, the result of multiple move events over a CNodeView is that the activation increases, approaching the MAX_ACT value.

After the increase in activation, the OnMouseMove function then propagates the activation increase to linked nodes 730 using the propagate procedure described below. Finally, all of the CNodeView activations are normalized 740, layout is done 750, and the CNodeViews are drawn at their new position 760.

Figure 8:
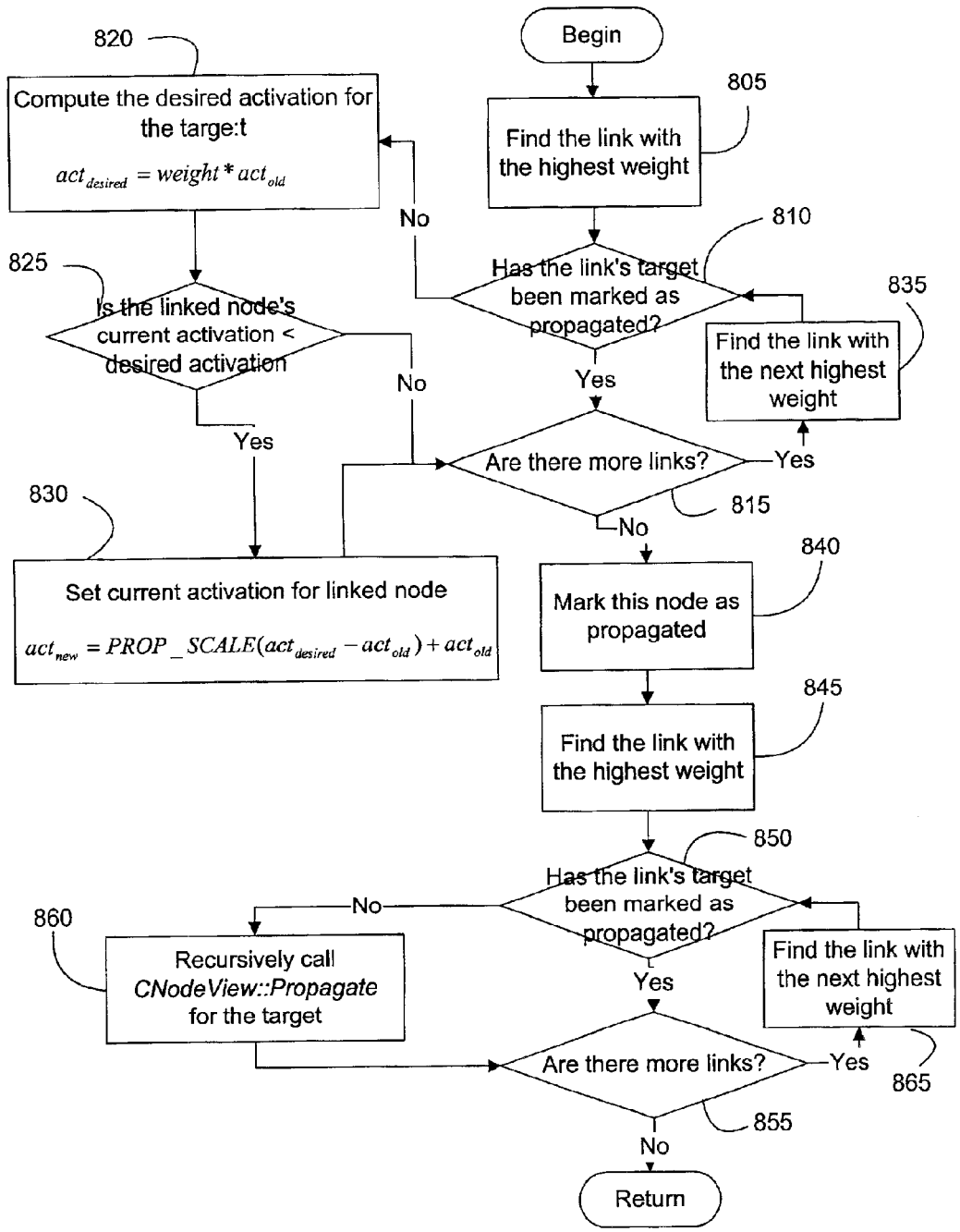
FIG. 8 is a flowchart depicting the operations comprising the CNodeView::Propagate procedure, which is responsible for propagating changes in activation of a particular CNodeView to linked CNodeViews.

FIG. 8 is a flowchart showing the CNodeView::Propagate procedure. During initialization, click activation, and move activation, activation is propagated from a node to linked nodes.

There is a single parameter, called scale, which controls the propagation. The scale parameter is a number in the range 0.0 to 1.0 indicating the amount of activation increase that should occur during the propagation.

Propagation proceeds by traversing the list of node links from the link with largest weight to the link with smallest weight 805–835. For each node link, the desired activation for the target node is computed 820 as $$act_{desired} = weight * act_{old} \qquad (3)$$

where weight is the weight of the link connecting the source node to the target node and $act_{old}$ is the targets old activation value. Then a test is performed to determine if the desired activation is greater than the current activation 825. If the desired activation is greater than the current activation, the new activation is computed 830 as $$act_{new} = PROP\_SCALE(act_{desired} - act_{old}) + act_{old} \qquad (4)$$

where $act_{new}$ is the target node's new activation and PROP_SCALE is a constant indicating how much the target node's activation should be increased toward the desired activation value. For the preferred embodiment this constant is 0.1.

As propagation is performed on each node, a flag is used to indicate that the node has been propagated 840. In this way, the recursive propagation procedure will not result in an endless loop.

After all of the links for the source node have been traversed for increasing the target activation values, they are traversed again in order from largest to smallest weight 845–865. This time, the entire propagation procedure is recursively called for each of the target nodes 860.

Figure 9:
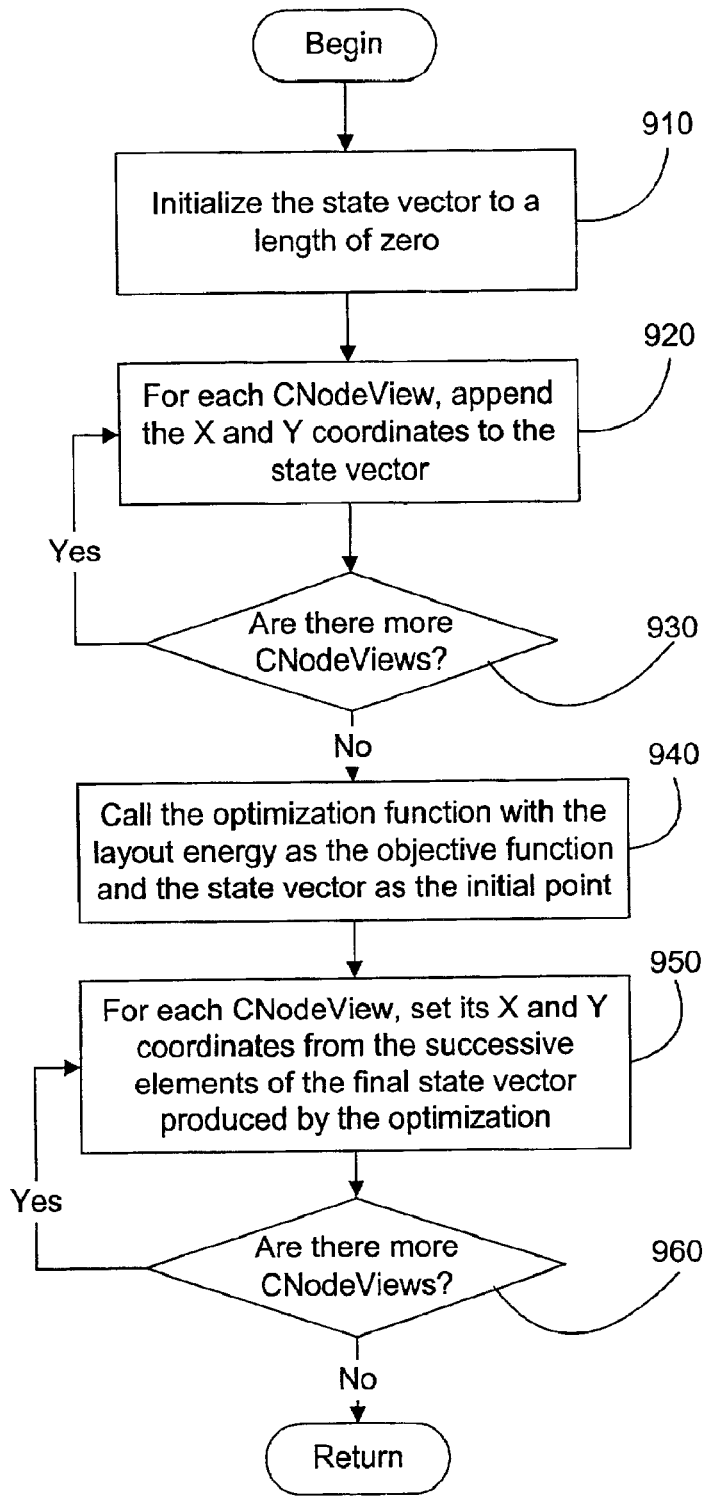
FIG. 9 is a flowchart depicting the operations comprising the CSpaceView::LayoutNodeViews procedure, which is responsible for determining the positions of a collection of CNodeViews given the activation values for the CNodeViews and link weights for the CNodes presented by the CNodeViews.

FIG. 9 is a flow chart showing the CSpaceView::LayoutNodeViews procedure. This is the procedure for actually determining optimal positions for the node views, given their activation values and link weights.

The layout is a numerical optimization that determines the positions of the CNodeViews based on an energy function. The energy function assumes a larger value for CNodeView positions that are not consistent with the desired mapping. So, by changing the layout positions to minimize the energy function, the system achieves an optimal layout for the node views.

Three possible optimizations can be used. The Powell direction-set method is a good general-purpose optimization that can be used for any defined energy function, without requiring gradient information. If gradient information is available, then the conjugate gradient optimization may be used instead of the Powell algorithm. Also, if gradient information is available, gradient descent may be used for small perturbations to the system. The energy functions that are defined for the present invention have gradient information available, so any of the three optimizations can be used to perform the layout.

The energy function is built up out of 2-dimensional Gaussian distributions.

$$G(x, y; \sigma) = \frac{1}{\sqrt{2\pi}\,\sigma} \exp\left[-\frac{x^2 + y^2}{2\sigma^2}\right] \qquad (5)$$

One distribution, the spacing distribution $G_{spacing}$, is used to create space around each of the nodes. The $\sigma$ parameter of this distribution is proportional to the size of the node. The size of the node is itself proportional to the activation value.

A second Gaussian distribution, the attraction distribution $G_{attract}$, is used to pull together nodes with large link weights. This distribution's sigma parameter is also proportional to the size of the node, and its amplitude is proportional to the link weight connecting the two nodes.

These two distributions are summed over all pairs of nodes to create the total energy of the current layout. This energy depends on the node activation values, the link weight values, and the current set of node positions.

$$E = \sum_{i=1}^{N} \sum_{j=1}^{N} G_{spacing}(x_i - x_j, y_i - y_j; \sigma) - \\ w_{ij} G_{attract}(x_i - x_j, y_i - y_j; \sigma) \qquad (6)$$

where i and j are indices over all of the nodes, $(x_i, y_i)$ is the position of node i, and $w_{ij}$ is the weight of the link connecting node i to node j.

Other objective functions may also be defined for the layout procedure. For instance, a quadratic penalty function could be employed that was at a minimum for optimal node placements, and increased quadratically as node placements deviated from the optimal placement. Linear combinations of objective functions might also be used as well, allowing distinct factors to influence the layout procedure.

The optimization occurs over a state space composed of all of the positions of the nodes. So, for N nodes, the state space is a 2N-dimensional space. The current state of the system is a 2N-dimensional position vector in this space.

The CSpaceView::LayoutNodeViews procedure first forms this state vector from the current positions of the CNodeViews 910–930. Then the optimization is called 940 with the energy function described above passed as the objective function and the state vector as the initial point. It optimizes the objective function and returns a new state vector, which is the state that has a minimum energy as defined by the objective function.

After the optimization, the new positions of the CNodeViews are extracted from the new state vector 950–960. This results in a new layout that minimizes the energy given by the objective function. This layout must be recomputed any time the CNodeView activations or link weights are changed.

Operation of the Preferred Embodiment

User operation of the preferred embodiment begins with the specification of the collection of nodes to be traversed. The form of this specification depends on the application configuration: for a stand-alone application, the user may directly specify the file that contains the nodes. For a browser plug-in, browsing to a particular site would trigger launching of the plug-in and loading of the nodes. After the nodes have been loaded, the application determines the initial activations and node positions as described in the detailed description.

Figure 10:
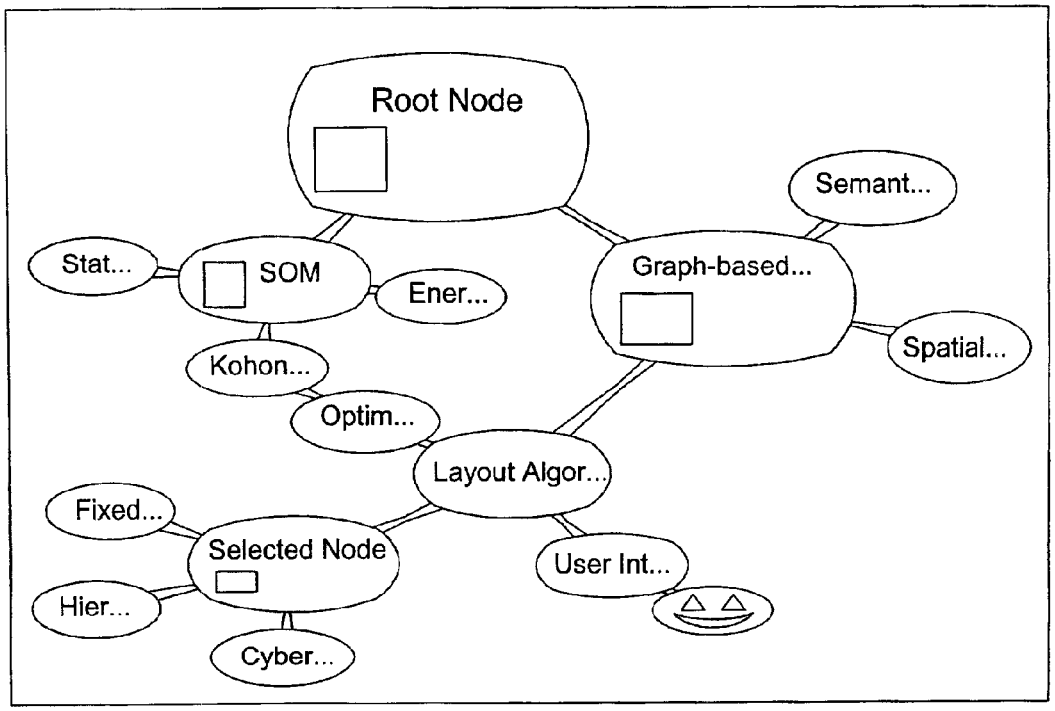
FIG. 10 is an example of the present invention's user interface.

FIG. 10 shows an example of the user interface for the present invention. The nodes are presented in the appropriate position with the correct size, based on the initial activation value. The presentation may include various elements for each node, including descriptive text, images, audio, and video. The presentation may also include executing a computer program associated with the node.

The user can now begin traversing the space by mouse-clicking on a node in which they are interested. As a node is clicked, its activation is increased by a determined amount, leading to an increase in size of the node's presentation on the screen. At the same time, the increase in activation is propagated to linked nodes. The presentations of these linked nodes are increased in size, also, in an amount proportional to the weight of the links.

Alternatively, the user can put the software in the move-activation state. In the move-activation state, movement of the mouse pointer over a node will move-activate the node. Propagation to linked nodes also occurs with move-activation. To activate the node even further, the user can continue to move the mouse pointer over the node in a circular or waving motion.

Normalization of the node activations occurs after each click- or move-activation to ensure that the total activation for all nodes is at or below a given limit. Also, the layout algorithm is triggered after each click- or move-activation, arranging the nodes based on their new sizes so that nodes which are more related (based on the link weights) are placed in closer proximity than nodes which are less related.

The user can continue activating nodes, traversing the space based on interest in the progression of nodes being presented to them. When the user is finished traversing the space, they may either stop the application or browse to a new location.

This invention provides a unique and intuitive user interface for browsing collections of interconnected pieces of information. The information may be World-Wide Web sites, book summaries, scientific references, music clips, movie clips, personal interests, descriptions of merchandise, and any of a myriad of other possibilities.

I claim:

1. A method for organizing and processing a plurality of nodes, comprising (a) Storing said plurality of nodes, (b) Tracking for each node a measure of interest held by the user in said node, said measure being referred to as the "activation" of said node, (c) Presenting said plurality of nodes to said user using an output device, wherein each node is allocated a fraction of the output capacity of said output device, said fraction being substantially proportional to the activation of said node, (d) Interpreting user input indicating interest in a node such that activation of said node is increased, (e) Storing with a first node a plurality of links, each link referring to a second node, and storing with each link a measure of relatedness of said first node to said second node, said measure being referred to as the "weight" of said link, (f) Presenting to said user a plurality of nodes using said output device, wherein the proximity of the presentation of a first node to the presentation of a second node is substantially proportional to the weight of the link between said first node and said second node, whereby the output capacity of said output device is efficiently allocated for the presentation of nodes of interest to said user, and for the presentation of nodes that are non-hierarchically related to said nodes of interest, whereby a plurality of non-hierarchically related nodes may be stored and efficiently navigated.

2. The method of claim 1, further including (a) Responding to increased activation of a first node by updating the activation of a second node such that activation of said second node is increased by an amount substantially proportional to the weight of the link between said first node and said second node, whereby user interest in a first node will result in an increase in activation of a second node by an amount substantially proportional to the relatedness of said second node to said first node, whereby a plurality of non-hierarchically related nodes may be more efficiently navigated.

3. The method of claim 2, further including (a) Storing said plurality of nodes wherein each node includes one or more elements selected from the group consisting of descriptive text, images, audio, video, and computer programs, (b) Presenting to said user a plurality of nodes on said output device, wherein said output device is capable of presenting the elements of a node within the fraction of the output capacity of said output device allocated to said node, whereby said elements of said node are displayed in an amount of detail proportional to said user's interest in said node.

* * * * *